(12) United States Patent
Dugan et al.

(10) Patent No.: US 7,668,196 B2
(45) Date of Patent: Feb. 23, 2010

(54) COMMUNICATING BETWEEN COMMUNICATIONS COMPONENTS HAVING DIFFERING PROTOCOLS ABSENT COMPONENT MODIFICATIONS

(75) Inventors: Robert J. Dugan, Hyde Park, NY (US); Giles R. Frazier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 11/042,488

(22) Filed: Jan. 25, 2005

(65) Prior Publication Data

US 2006/0165119 A1 Jul. 27, 2006

(51) Int. Cl.
*H04J 3/16* (2006.01)

(52) U.S. Cl. ...................................... 370/466
(58) Field of Classification Search ................. 370/466, 370/401, 389, 392; 707/100, 101; 709/246, 709/236, 230
See application file for complete search history.

(56) References Cited

U.S. PATENT DOCUMENTS

| | | | | |
|---|---|---|---|---|
| 5,420,916 | A | 5/1995 | Sekiguchi | 379/230 |
| 5,778,189 | A | 7/1998 | Kimura et al. | 395/200.66 |
| 6,084,887 | A | 7/2000 | Salisbury et al. | 370/467 |
| 6,151,390 | A | 11/2000 | Volftsun et al. | 379/229 |
| 6,542,954 | B1 | 4/2003 | Aruga | 710/316 |
| 6,571,367 | B1 | 5/2003 | Mano et al. | 714/763 |
| 6,647,528 | B1 | 11/2003 | Collette et al. | 714/758 |
| 6,683,883 | B1 | 1/2004 | Czeiger et al. | 370/401 |
| 6,728,803 | B1 * | 4/2004 | Nelson et al. | 710/60 |
| 7,113,512 | B1 * | 9/2006 | Holmgren et al. | 370/395.53 |
| 2003/0103504 | A1 | 6/2003 | Dugan et al. | 370/392 |
| 2005/0157750 | A1 * | 7/2005 | Rabie et al. | 370/466 |

OTHER PUBLICATIONS

"American National Standard for Information Technology—Single-Byte Command Code Sets CONnection (SBCON) Architecture," ANSI INCITS 296-1997 (R2002).
American National Standard for Information Technology—Fibre Channel Arbitrated Loop (FC-AL-2), ANSI INCITS 332-1999.
American National Standard for Information Technology—Fibre Channel—Framing and Signaling (FC-FS), ANSI INCITS 373-2003.
American National Standard for Information Technology—Fibre Channel—Generic Services-4 (FC-GS-4), ANSI INCITS 387-2004.
American National Standard for Information Technology—Fibre Channel—Single-Byte Command Code Sets Mapping Protocol—3 (FC-SB-3), ANSI INCITS 374-2003.

* cited by examiner

*Primary Examiner*—Hanh Nguyen
*Assistant Examiner*—Juvena Loo
(74) *Attorney, Agent, or Firm*—John E. Campbell; Blanche E. Schiller, Esq.; Heslin Rothenberg Farley & Mesiti P.C.

(57) ABSTRACT

Communication between components having differing protocols is facilitated by a protocol converter coupled between the components that converts communications of one protocol into communications of another protocol. This conversion is performed without requiring code modification to either of the components. The conversion includes translating identifiers of one protocol to identifiers of another protocol.

53 Claims, 6 Drawing Sheets fig. 1

200  TABLE A

| ESCON PORT # (202) | ESCON LINK ADDRESS (204) | N_PORT ID (206) | WWPN (208) |
|---|---|---|---|
| 1 | X1 | dd aa 81 | name1 |
| 2 | X2 | dd aa 82 | name2 |
| ⋮ | | | |
| n | Xn | dd aa 8n | namen |

*fig. 2*

300  TABLE B

| CHANNEL N_PORT ID (302) | VIRTUAL ESCON LINK ADDRESS (304) |
|---|---|
| dd 01 00 | 01 |
| dd 02 00 | 02 |
| ⋮ | |
| dd FE 00 | FE |

*fig. 3*

400  TABLE C

| WWPN (402) | ASSIGNED N_PORT ID (404) |
|---|---|
| name1 | dd aa 81 |
| name2 | dd aa 82 |
| ⋮ | |
| namen | dd aa 8n |

COMMUNICATING BETWEEN COMMUNICATIONS COMPONENTS HAVING DIFFERING PROTOCOLS ABSENT COMPONENT MODIFICATIONS

TECHNICAL FIELD

This invention relates, in general, to communications within a communications environment, and in particular, to facilitating communications between components of a communications environment that have differing communications protocols.

BACKGROUND OF THE INVENTION

As technologies emerge, situations arise in which a component of a communications environment supporting one communications protocol needs to communicate with another component of the communications environment supporting a different communications protocol. For example, a computer with a capability to communicate in one protocol may need to communicate with a peripheral device that communicates in another protocol. One such example is a computer supporting the FICON protocol of International Business Machines Corporation, Armonk, N.Y., may need to access data on an input/output (I/O) device that conforms to the ESCON protocol offered by International Business Machines Corporation. In order to allow this type of communication, protocol conversion is employed that converts communications sent in one protocol to communications of the other protocol.

Protocol conversion is enabled by modifying the code or adding code to one or both of the components that are to communicate. For example, the FCV/McData Bridge-IBM 9032-5 ESCON DIRECTOR enables protocol conversion by modifying the host computer. This requirement to modify the host computer, however, introduces complexity in the host computer and provides serious drawbacks. Thus, a need still exists for a capability that enables a component of one communications protocol to communicate with a component of another communications protocol without requiring code modifications or any upgrades to one or more of the components.

SUMMARY OF THE INVENTION

The shortcomings of the prior art are overcome and additional advantages are provided through the provision of a method of facilitating communications between components of a communications environment. The method includes, for instance, obtaining a communication to be communicated between one component of the communications environment and another component of the communications environment, wherein the one component is of one protocol and the another component is of another protocol that differs from the one protocol; and translating at least a portion of the communication from one of the one protocol and the another protocol to the other of the one protocol and the another protocol, wherein the translating is performed absent modifications of at least one of the one component and the another component.

In another aspect of the present invention, a method of facilitating communications between input/output drivers and input/output units of a communications environment is provided. The method includes, for instance, obtaining by a protocol converter a communication from an input/output driver of the communications environment destined for an input/output unit of the communications environment, the input/output driver supporting one communications protocol and the input/output unit supporting another communications protocol that differs from the one communications protocol; translating by the protocol converter an identifier specified in the communication that is of the one communications protocol to an identifier of the another communications protocol, wherein the translating is performed absent modification of at least one of the input/output driver and the input/output unit; and forwarding a translated communication to the input/output unit, the translated communication including the identifier of the another communications protocol.

In yet a further aspect of the present invention, a method of facilitating communications between input/output drivers and input/output units of a communications environment is provided. The method includes, for instance, obtaining by a protocol converter a communication from an input/output unit of the communications environment destined for an input/output driver of the communications environment, the input/output unit supporting one communications protocol and the input/output driver supporting another communications protocol that differs from the one communications protocol; translating by the protocol converter an identifier specified in the communication that is of the one communications protocol to an identifier of the another communications protocol, wherein the translating is performed absent modification of at least one of the input/output driver and the input/output unit; and forwarding a translated communication to the input/output driver, the translated communication comprising the identifier of the another communications protocol.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided that facilitates communication between components of a communications environment having differing communications protocols. As one particular example, a capability is provided that facilitates communication between a FICON channel and an ESCON control unit, offered by International Business Machines Corporation, Armonk, N.Y. Communication is facilitated by, for instance, using a protocol converter coupled to the channel and the control unit to convert communications sent in one protocol to communications to be received in another protocol.

Figure 1:
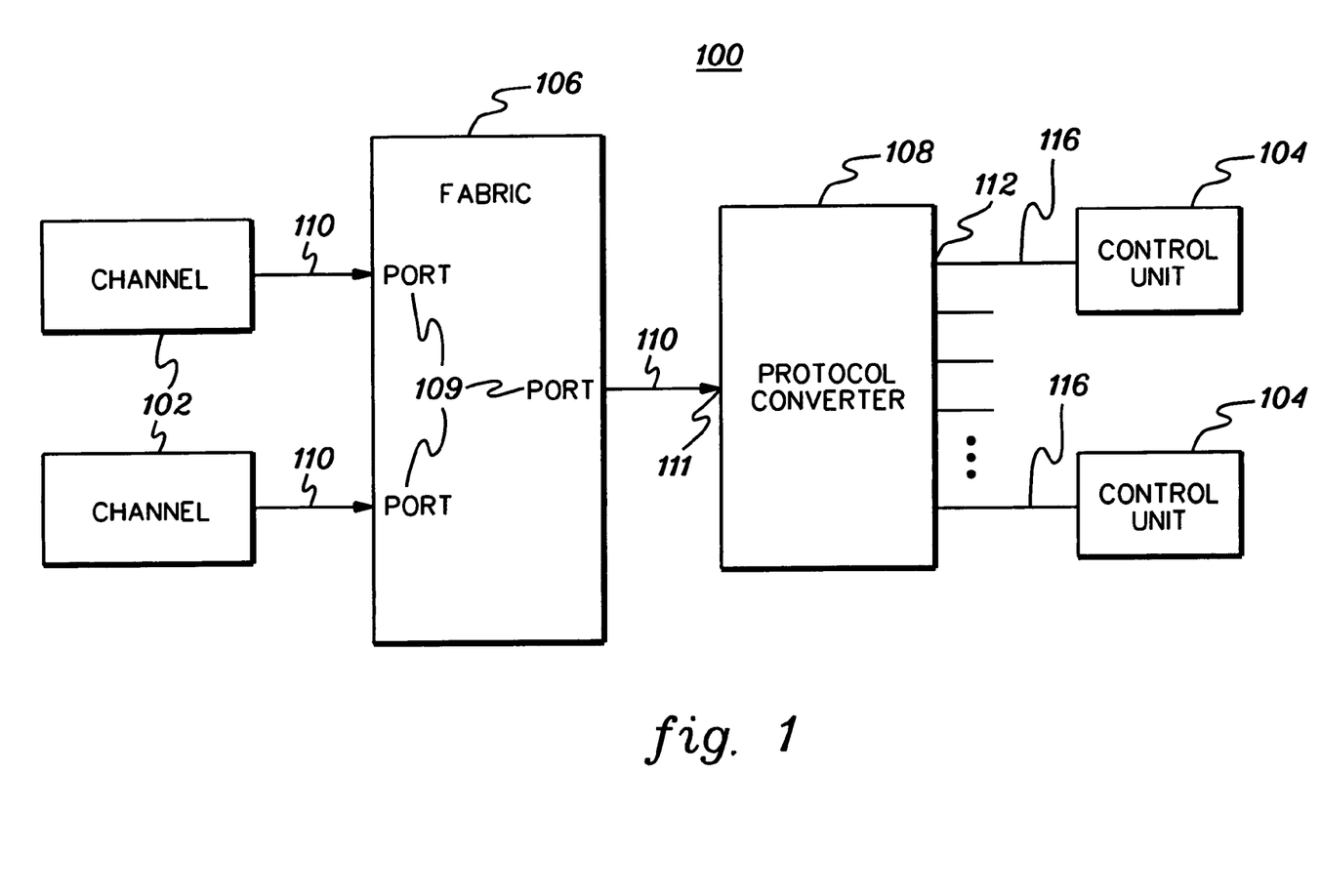
FIG. 1 depicts one example of a communications environment incorporating and using one or more aspects of the present invention.

One embodiment of a communications environment incorporating and using one or more aspects of the present invention is depicted in FIG. 1. In this particular example, communication is between input/output drivers (e.g., channels) of one protocol (e.g., FICON) and input/output units (e.g., control units) of another protocol (e.g., ESCON). Although the examples described herein are for communications between FICON channels and ESCON control units, these are only examples. One or more aspects of the present invention can be used with other types of channels and/or control units, as well as with other types of components that can benefit from protocol conversion and/or in any application in which an entity using one communications protocol communicates with another entity using another communications protocol.

Referring to FIG. 1, a communications environment 100 includes one or more channels 102 coupled to one or more control units 104 via a fabric 106 and a protocol converter 108. Channels 102 support, for instance, the FICON protocol offered by International Business Machines Corporation, Armonk, N.Y., and control units 104 support, for instance, the ESCON protocol offered by International Business Machines Corporation, Armonk, N.Y.

In one example, each of the FICON channels is assigned, during, for instance, initialization of the configuration of FIG. 1, a 3-byte N_Port ID (node port identifier), including a domain byte (dd), an area byte (aa) and a port byte (pp). The procedure for assigning an N_Port ID to a FICON channel is performed using well-known techniques specified in, for example, Fibre Channel-Single-Byte Code Sets Mapping Protocol (FC-SB-3), Document Number ANSI/INCITS 374-2003, available from International Committee for Information Technology Standards (INCITS), 1250 Eye Street NW, Suite 200, Washington, D.C. 20005, and Fibre Channel-Framing and Signaling Interface (FC-FS), Document Number ANSI/INCITS 373, available from International Committee for Information Technology Standards (INCITS), 1250 Eye Street NW, Suite 200, Washington, D.C. 20005, each of which is hereby incorporated herein by reference in its entirety. Typically, each FICON channel is assigned a unique value for the area byte (aa). This, however, is not a requirement of one or more aspects of this invention, but it does allow some simplification for the protocol converter.

Channels 102 are coupled to fabric 106 via one or more links 110, such as FICON links. Fabric 106 conforms to the requirements specified in Fibre Channel-Single-Byte Code Sets Mapping Protocol (FC-SB-3), Document Number ABSI/INCITS 374-2003, available from International Committee for Information Technology Standards (INCITS), 1250 Eye Street NW, Suite 200, Washington, D.C. 20005, and Fibre Channel-Framing and Signaling Interface (FC-FS), Document Number ANSI/INCITS 373, available from International Committee for Information Technology Standards (INCITS), 1250 Eye Street NW, Suite 200, Washington, D.C. 20005, each of which is hereby incorporated herein by reference in its entirety. Fabric 106 includes a plurality of ports 109 (e.g., fabric ports or F_Ports) and supports N_Port ID virtualization (NPIV), which allows a plurality of port ids to be assigned to one N_Port, as described in a U.S. Patent Application entitled "Method And Apparatus For Obtaining Multiple Port Addresses By A Fibre Channel From A Network Fabric," Dugan et al., U.S. Patent Application Publication No. 2003/0103504 A1, published Jun. 5, 2003, which is hereby incorporated herein by reference in its entirety.

Fabric 106 is coupled to protocol converter 108 via one or more FICON links 110. Protocol converter 108 includes an N_Port 111, and as with the fabric, it supports N_Port ID virtualization allowing the protocol converter to acquire multiple addresses (N_Port IDs) from the fabric. The protocol converter provides n physical ports 112, each of which can connect to a control unit 104 or other peripheral device via one or more links 116, such as ESCON links, offered by International Business Machines Corporation, Armonk, N.Y.

By employing NPIV, the protocol converter is able to acquire a plurality of N_Port IDs: one N_Port ID for its N_Port and one N_Port ID for each of its physical ESCON ports 112, thus enabling the protocol converter to make each of the control units appear to the channels as if it were a control unit conforming to the protocol of the channel, instead of the protocol of the control unit. This allows the FICON channels to communicate with the ESCON control units, and vice versa, transparently without any modification to the FICON channels nor to the control units, as described in detail herein.

In order to facilitate one or more aspects of the present invention, a plurality of data structures are used that enable identifiers of one protocol to be converted to identifiers of another protocol. Examples of these data structures are described below.

Figure 2:
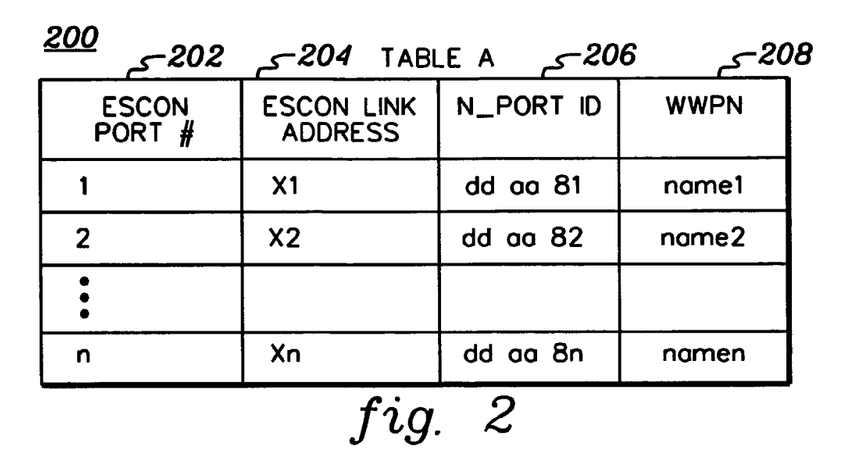
FIG. 2 depicts one example of a data structure used to convert destination identifiers of channel frames to link addresses, in accordance with an aspect of the present invention.

One data structure used in accordance with one or more aspects of the present invention is described with reference to FIG. 2. In this particular example, a data structure 200 includes a table, referred to as Table A, which is stored in the protocol converter. Although a table is described in this example, data structures other than tables may be employed. Data structure 200 includes, for instance, an ESCON port number column 202 indicating one or more ESCON port numbers; an ESCON link address column 204 including one or more ESCON link addresses; an N_Port ID column 206 specifying one or more port ids for the one or more ESCON ports; and a name column 208 specifying one or more unique world wide names corresponding to the one or more N_Port IDs. For convenience, this data structure is also referred to herein as a control unit data structure, since it includes information relevant to control units.

Figure 3:
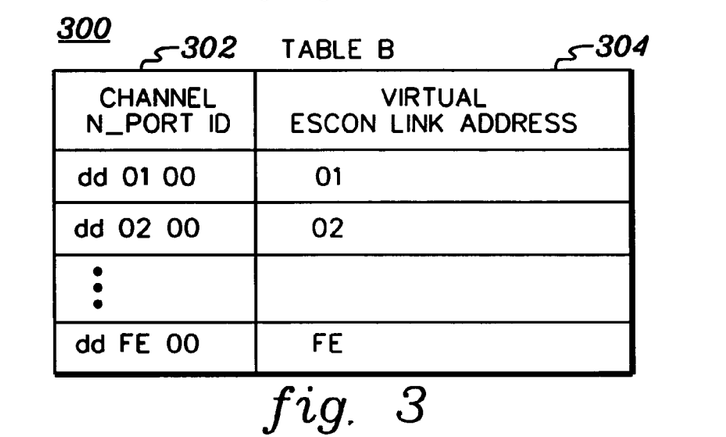
FIG. 3 depicts one example of a data structure used to convert source identifiers of channel frames to link addresses, in accordance with an aspect of the present invention.

Another data structure used in accordance with one or more aspects of the present invention is a data structure 300 (FIG. 3), which also resides in the protocol converter. In one example, this data structure is also a table, referred to as Table B; however, in other embodiments, the data structure can be other than a table. In this particular example, data structure 300 includes a channel N_Port ID column 302 specifying one or more channel N_Port IDs; and a virtual ESCON link address column 304 specifying one or more virtual ESCON link addresses corresponding to the one or more channel N_Port IDs. For convenience, this data structure is referred to herein as a channel data structure, since it includes information relevant to channels.

Figure 4:
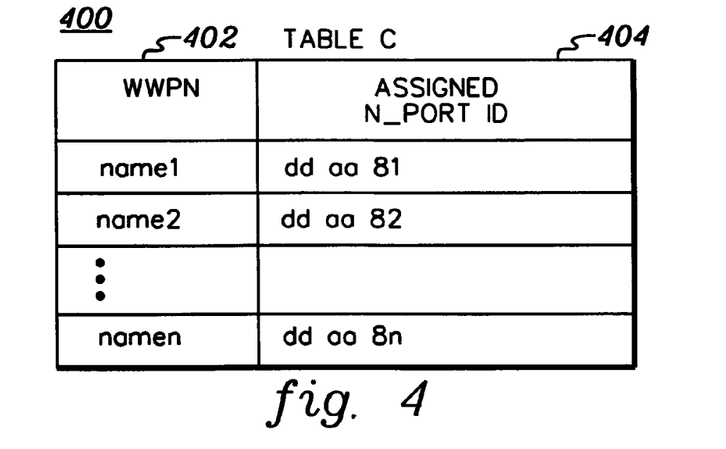
FIG. 4 depicts one example of a data structure used to correspond identifiers and names, in accordance with an aspect of the present invention.

Yet another data structure used in accordance with one or more aspects of the present invention is a data structure 400 (FIG. 4). In one example, this data structure is also a table, referred to as Table C; however, in other embodiments, a data structure other than a table may be used. This data structure resides in the fabric, and is optionally used, in one example, to determine a name that corresponds to an N_Port ID. Data structure 400 includes, for instance, a name column 402, specifying one or more names, and an assigned N_Port ID column 404 specifying one or more port ids corresponding to the one or more names.

Use of one or more of the data structures is described below with reference to initializing the protocol converter and employing the protocol converter for communications between channels and control units of differing protocols.

One embodiment of the logic associated with initializing the protocol converter is described with reference to FIG. 5. Initialization commences, STEP 500, and the protocol converter obtains from, for instance, fabric 106, an N_Port ID for N_Port 111, STEP 502, using well-known procedures, as described in Fibre Channel-Framing and Signaling Interface (FC-FS), Document Number ANSI/INCITS 373, Dec. 3, 2003 available from International Committee for Information Technology Standards (INCITS), 1250 Eye Street NW, Suite 200, Washington, D.C. 20005, which is hereby incorporated herein by reference in its entirety. If necessary or desired, the N_Port ID that the fabric assigns to the protocol converter can be preconfigured into the fabric so that it is known in advance by the channel.

Further, the protocol converter registers the N_Port ID with a configuration server of the fabric and indicates to the configuration server that it is a protocol converter, STEP 504. One example of registering the N_Port ID is described in Fibre Channel-General Service 4 (FC-GS-4), Document Number ANSI/INCITS 387-2004, Oct. 7, 2004, available from International Committee for Information Technology Standards (INCITS), 1250 Eye Street NW, Suite 200, Washington, D.C. 20005, which is hereby incorporated herein by reference in its entirety. The registration allows the FICON channels to discover the PCU's N_Port ID, but such registration is not required. Instead, the channel can use alternative means of discovering the protocol converter's N_Port ID, such as having the N_Port ID preconfigured into the FICON channel.

Also, as part of the initialization, the protocol converter initializes its ESCON links 116 and assigns each of its ESCON links a one-byte ESCON link address, STEP 506. One embodiment of assigning the link addresses is described in Single-Byte Command Code Sets Connection Architecture (SBCON), Document Number ANSI/INCITS 295-1997, 1997 (R 2002), available from International Committee for Information Technology Standards (INCITS), 1250 Eye Street NW, Suite 200, Washington, D.C. 20005, which is hereby incorporated herein by reference in its entirety. The address assigned to each port is, for instance, equal to xn, where x is one nibble set to any value, and n is one nibble set to a value equal to the physical port number. In another embodiment, the ESCON link addresses are set to any value xy, provided these values are unique. Further, in other embodiments, the size of the values can differ from the examples provided herein. As these ESCON link addresses are assigned, data is entered in columns 202 and 204 of data structure 200.

Subsequent to the protocol converter obtaining its first N_Port ID, it obtains from the fabric one additional N_Port ID for each of its ESCON ports using N_Port ID virtualization, as described in Fibre Channel-Framing and Signaling Interface (FC-FS), Document Number ANSI/INCITS 373, Dec. 3, 2003, available from International Committee for Information Technology Standards (INCITS), 1250 Eye Street NW, Suite 200, Washington, D.C. 20005, and U.S. Patent Application entitled "Method And Apparatus For Obtaining Multiple Port Addresses By A Fibre Channel From A Network Fabric," Dugan et al., U.S. Patent Application Publication No. 2003/0103504 A1, published Jun. 5, 2003, each of which is hereby incorporated herein by reference in its entirety. In this example, in response to a request from the protocol converter for other N_Port IDs, the fabric assigns N_Port IDs (dd aa pp), where the pp field is consecutively assigned starting with the same value as the first link address in data structure 200. (The fabric could be preconfigured to do this.) As the additional N_Port IDs are acquired by the protocol converter, the protocol converter enters the identifiers in column 206 of data structure 200.

Moreover, in one example, a unique 64-bit number (i.e., name) is provided for each ESCON physical port. The protocol converter is preconfigured with this information, which is stored in column 208 of data structure 200. The format of these names conforms to the port name requirements specified in, for instance, Fibre Channel-Framing and Signaling Interface (FC-FS), Document Number ANSI/INCITS 373, Dec. 3, 2003, available from International Committee for Information Technology Standards (INCITS), 1250 Eye Street NW, Suite 200, Washington, D.C. 2000.

In the example described above, the N_Port IDs assigned by the fabric have common domain bytes and area bytes (dd and aa) and the port bytes (pp) are consecutively assigned with the first pp value set to the same value as the ESCON link address of the first port on the protocol converter. However, this is not required by one or more aspects of the present invention; although, it does provide simplification because it allows the channel to know the N_Port IDs that will be assigned in advance if the fabric has been configured to assign the first N_Port ID to a specific value, as explained herein. An alternative embodiment is one in which the fabric is configured with data structure 400 including the same set of 64-bit port names as those included in data structure 200. Each of these port names would have a corresponding N_Port ID. Then, whenever the fabric received a request from the protocol converter for another N_Port ID, it would access data structure 400 and assign the N_Port ID corresponding to the port name received in the request. Either of these alternative embodiments results in a deterministic assignment of N_Port IDs by the fabric. This would, therefore, enable FICON channels to be preconfigured with a set of N_Port IDs corresponding to the ESCON control units with which they are to communicate. This eliminates the need for the FICON channels to access the fibre channel name server to determine N_Port IDs corresponding to the ESCON control units with which they are to communicate.

Figure 5:
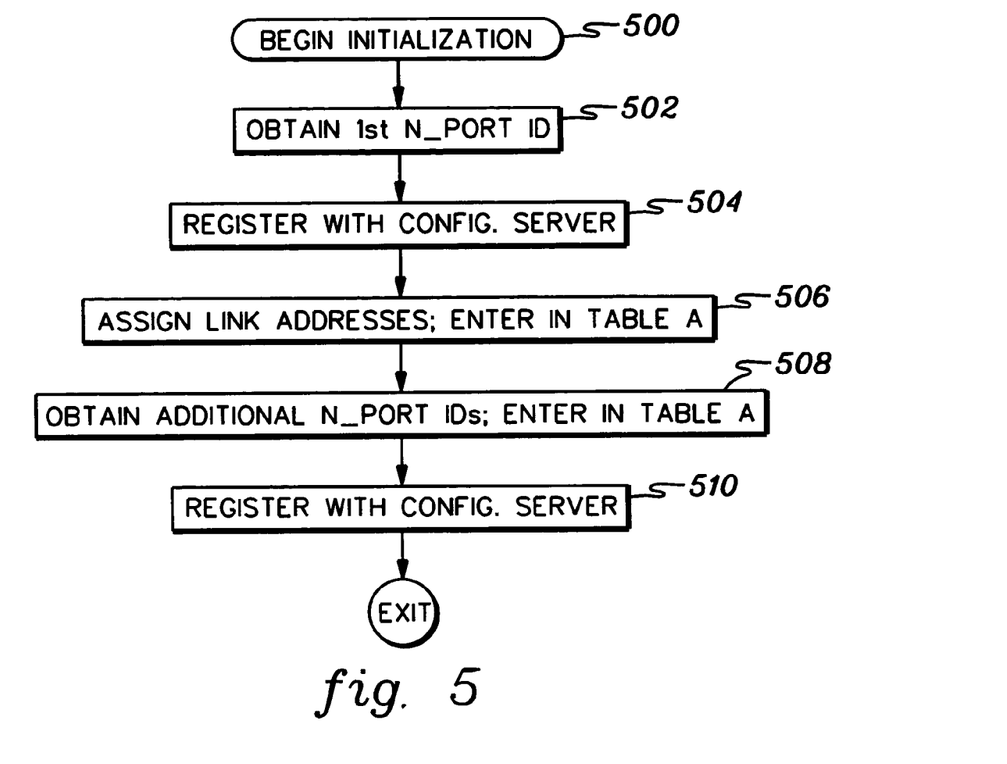
FIG. 5 depicts one embodiment of the logic associated with initializing a protocol converter, in accordance with an aspect of the present invention.

Continuing with FIG. 5, after all the N_Port IDs have been obtained (or after each N_Port ID acquisition, or any combination thereof), the protocol converter optionally registers each N_Port ID with various known services in the fabric in order to receive notifications for state changes, link incidents and other events, STEP 510.

Figure 6:
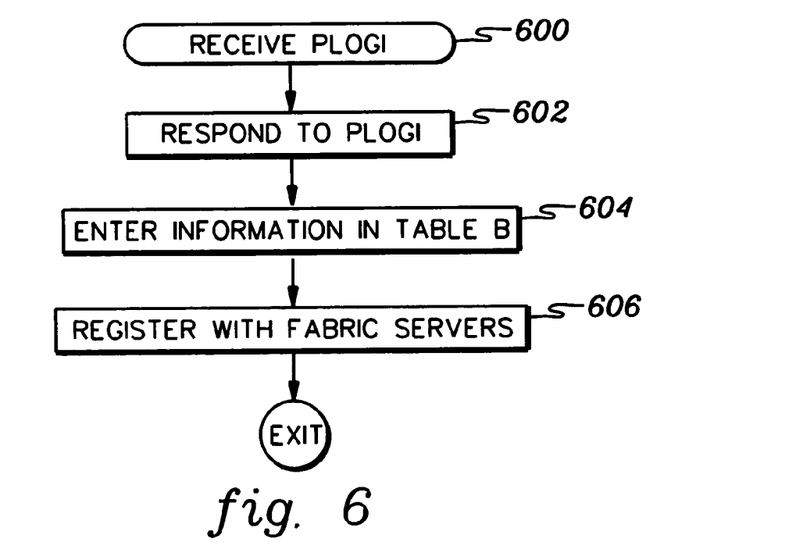
FIG. 6 depicts one embodiment of the logic associated with managing port logins, in accordance with an aspect of the present invention.

In addition to the above, further initialization occurs when the protocol converter receives a port login (PLOGI) from one or more FICON channels, STEP 600 (FIG. 6). A port login is used by FICON channels to establish communication with control units. (See, e.g., Fibre Channel-Framing and Signaling Interface (FC-FS), Document Number ANSI/INCITS 373, Dec. 3, 2003, available from International Committee for Information Technology Standards (INCITS), 1250 Eye Street NW, Suite 200, Washington, D.C. 20005.)

In response to receiving a port login, the protocol converter responds to the port login, as described in the Fibre Channel-Framing and Signaling Interface (FC-FS), STEP 602, and enters the N_Port ID provided in the login in column 302 (FIG. 3) of data structure 300, STEP 604. The protocol converter also assigns the channel a virtual ESCON link address and enters this link address in column 304 of data structure 300. Any virtual ESCON link address can be chosen by the protocol converter, provided that it is not the same as any of the link addresses assigned to the control units (Table A) and it is different from the other virtual ESCON link addresses previously entered in data structure 300. In the particular example shown in data structure 300 (Table B), the virtual ESCON link addresses assigned are equal to the area bytes of the N_Port IDs of the corresponding FICON channels. However, this is not a requirement. It is a simplification that can result in a less complex protocol converter design in certain configurations.

Thereafter, optionally, the protocol converter registers the N_Port IDs with one or more fabric servers, STEP 606. Further, additional channel logins may be received at any time, and as they occur, the same process as described above with STEPS 600-606 are performed. This process results in the addition of one or more other rows to Table B.

Subsequent to completing initialization, the protocol converter is able to facilitate communications between the FICON channels and the ESCON control units. One embodiment of the processing associated with employing the protocol converter to communicate between FICON channels and ESCON control units is described with reference to FIGS. 7-8. In particular, one embodiment of the logic associated with the operation of the protocol converter upon receiving a communication from a FICON channel is described with reference to FIG. 7; and one embodiment of the logic associated with the operation of the protocol converter upon receiving a communication from an ESCON control unit is described with reference to FIG. 8.

Figure 7:
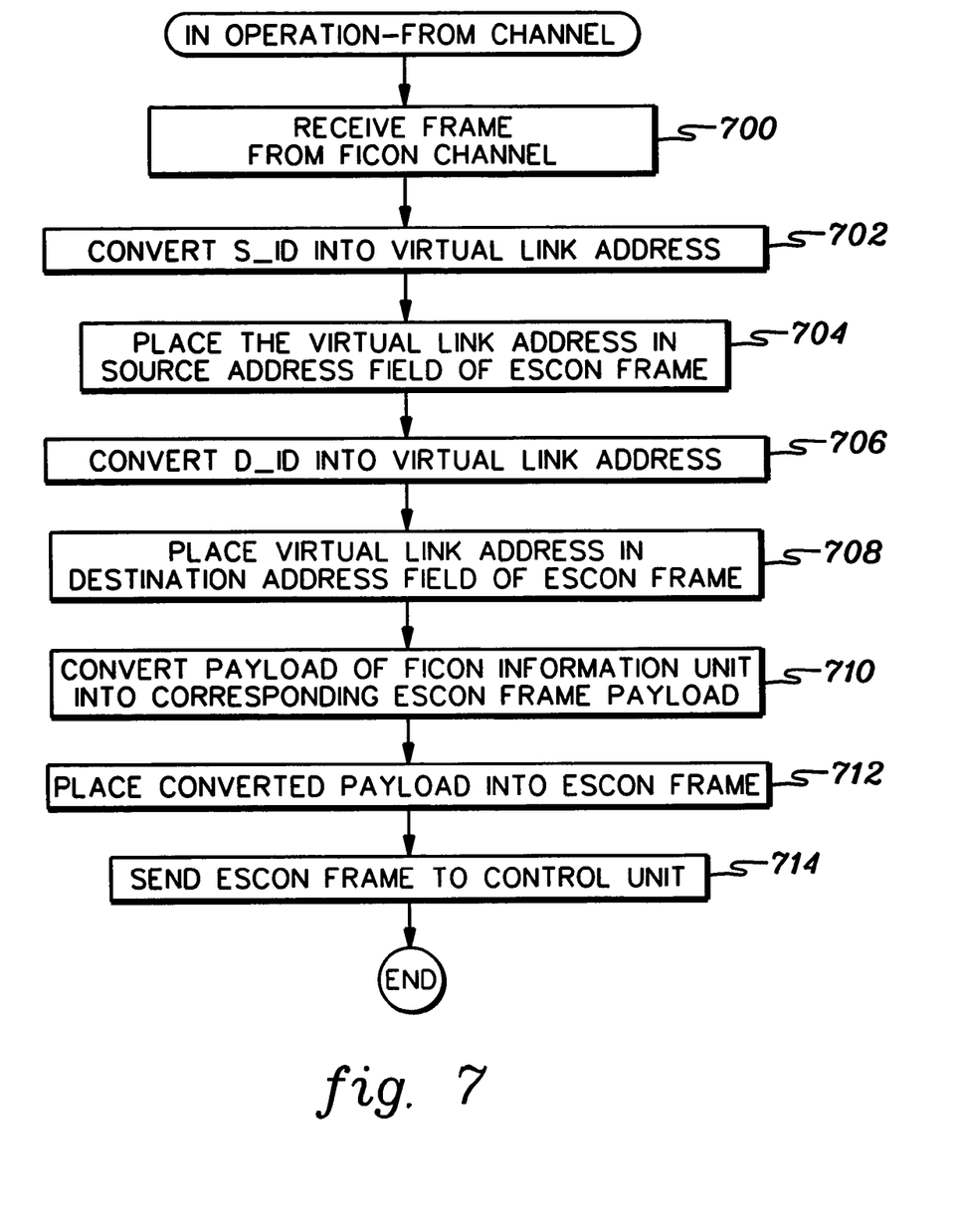
FIG. 7 depicts one embodiment of the logic associated with a protocol converter handling frames received from channels and destined to control units, in accordance with an aspect of the present invention.
Figure 9:
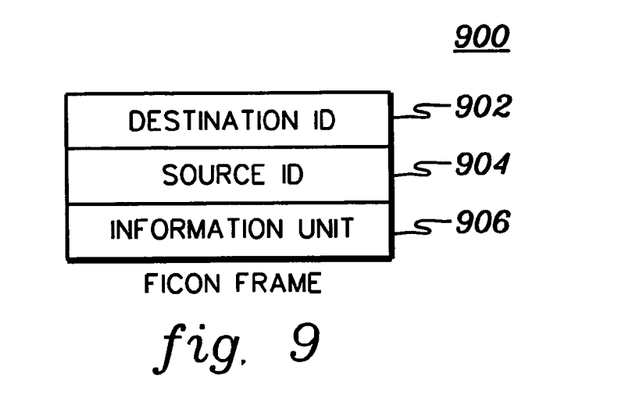
FIG. 9 depicts one example of several fields of a FICON frame, in accordance with an aspect of the present invention.

Referring to FIG. 7, initially, the protocol converter receives a communication, such as a FICON frame, from a FICON channel, STEP 700. The FICON frame includes a plurality of fields, several of which are described with reference to FIG. 9. For example, a FICON frame 900, includes a destination identifier (D_ID) field 902 specifying the destination (e.g., control unit) to receive the frame (In one example, the destination ids are preconfigured.); a source identifier (S_ID) field 904 indicating the channel sending the frame; and an information unit 906 providing various information, such as flags, counts, data, etc. The destination identifier and the source identifier are in the format of the protocol of the channel. The FICON frame may also include different and/or additional information, as described in Fibre Channel-Single-Byte Code Sets Mapping Protocol (FC-SB-3), Document Number ANSI/INCITS 374-2003, available from International Committee for Information Technology Standards (INCITS), 1250 Eye Street NW, Suite 200, Washington, D.C. 20005, which is hereby incorporated herein by reference in its entirety.

Thereafter, the protocol converter converts the S_ID from the FICON frame into the corresponding virtual ESCON link address, STEP 702. In one example, this is performed using data structure 300 of FIG. 3. In particular, the S_ID, also referred to as the Channel N_Port ID in Table B, is used as an index into the table to select a row of the table. The link address assigned to the selected row is the converted address for the S_ID. The protocol converter places the selected virtual link address in a source address field of an ESCON frame, STEP 704.

Figure 10A:
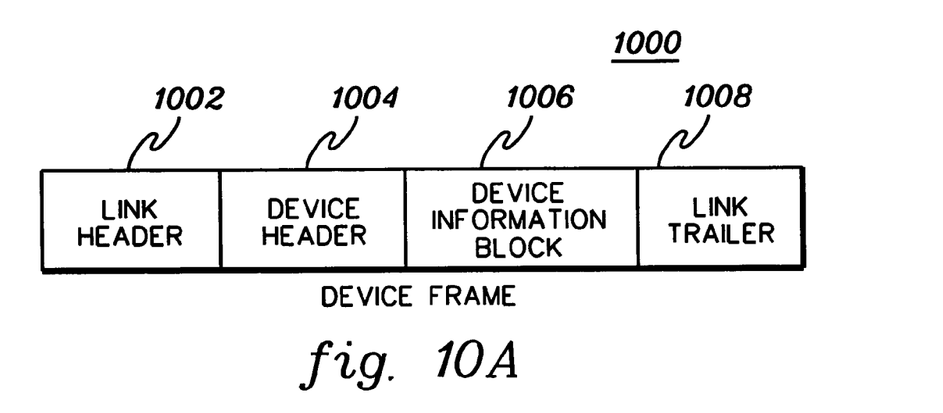
FIG. 10A depicts one example of the various components of an ESCON device frame, in accordance with an aspect of the present invention.
Figure 10B:
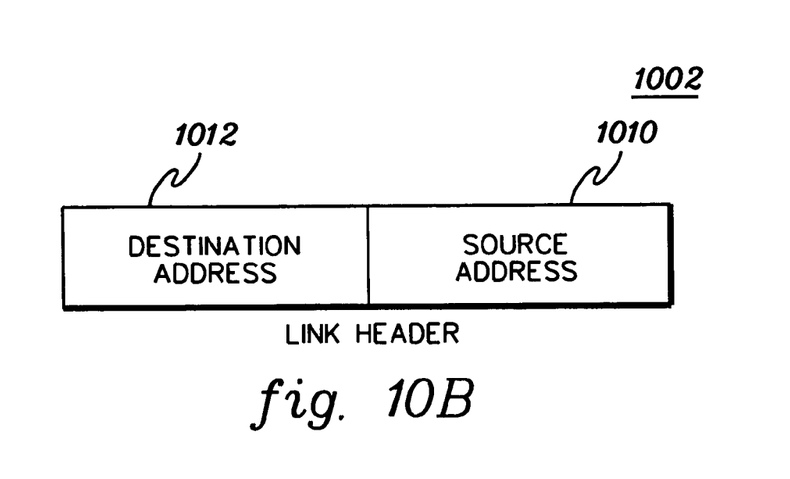
FIG. 10B depicts one example of various fields of a link header of the ESCON device frame of FIG. 10A, in accordance with an aspect of the present invention.

In particular, as with FICON frames, ESCON frames also include a number of fields, as described in Single-Byte Command Code Sets Connection Architecture (SBCON), Document Number ANSI/INCITS 295-1997, 1997 (R 2002), available from International Committee for Information Technology Standards (INCITS), 1250 Eye Street NW, Suite 200, Washington, D.C. 20005, which is hereby incorporated herein by reference in its entirety. One example of an ESCON frame is described with reference to FIGS. 10*a* and 10*b*. An ESCON frame 1000 (FIG. 10*a*) includes, for instance, a link header 1002, a device header 1004, a device information block 1006, and a link trailer 1008. Link header 1002 includes a source address field 1010 (FIG. 10*b*), which stores the selected link addresses, and a destination address 1012, which stores other converted addresses, as described below. The link header, as well as other fields of the ESCON frame, may include different and/or additional fields and/or information.

Returning to FIG. 7, the protocol converter also converts the D_ID from the FICON frame into a corresponding ESCON link address, STEP 706. In one example, this conversion is performed using data structure 200 of FIG. 2. In particular, the D_ID, also referred to as the N_Port ID in Table A, is used as an index into the table to locate the appropriate row. From that row, the corresponding link address is obtained. Thereafter, the selected link address is placed in the destination address field of the ESCON frame, STEP 708.

Moreover, the protocol converter converts the payload of the FICON information unit into a corresponding ESCON frame payload, STEP 710, and this converted payload is placed in an ESCON frame, STEP 712. In one example, during this conversion, various flags and other information are selected from the FICON frame (as specified in, for instance, the FC-SB-3 standard, Information Technology—Fibre Channel-Single-Byte Code Sets Mapping Protocol (FC-SB-3), Document Number ANSI/INCITS 374-2003, available from International Committee for Information Technology Standards (INCITS), 1250 Eye Street NW, Suite 200, Washington, D.C. 20005, which is hereby incorporated herein by reference in its entirety), converted, if necessary (e.g., arranging bits or bytes differently), and placed in the appropriate locations within the ESCON frame as specified in, for instance, the SBCON standard, Single-Byte Command Code Sets Connection Architecture (SBCON), Document Number ANSI/INCITS 295-1997, 1997 (R 2002), available from International Committee for Information Technology Standards (INCITS), 1250 Eye Street NW, Suite 200, Washington, D.C. 20005, which is hereby incorporated herein by reference in its entirety.

For example, if there is a field in the ESCON frame that corresponds to a field in the FICON frame, the field in the ESCON frame is set to the same or equivalent value as the field in the FICON frame, although it may be at a different location. If there is no corresponding field in the ESCON frame that corresponds to the field in the FICON frame, then the protocol converter processes the FICON field according the FC-SB-3 standard. For instance, there is a "CRR flag" in the CCW flag field of the FICON command information unit, but no such flag exists in the ESCON command frame. The FC-SB-3 standard requires that whenever this flag is set to one in a command information unit, then the control unit should send a command-response information unit to the channel when the control unit starts to execute the command. Therefore, if the protocol converter recognizes that this flag is set, then it should send a command-response information unit to the FICON channel, when it receives a command-response frame from the ESCON control unit (indicating that the ESCON control unit has started executing the command); otherwise the protocol converter should not send a command-response information unit to the channel, when it receives a command-response from the ESCON control unit for the command. Other bits, flags, etc. are handled similarly.

It is also possible that multiple ESCON frames may be required to include all the information within the FICON information unit, and if so, the source and destination link addresses of each of the multiple ESCON frames are identical. Further, in some cases, the protocol converter may need to interchange multiple frames with the ESCON control unit in order to completely process a FICON information unit.

The one or more ESCON frames are then sent to the appropriate control unit, STEP 714.

The protocol converter also converts ESCON frames to FICON frames to enable the ESCON control units to communicate with the FICON channels. As ESCON frames are received from the control units, the protocol converter processes those frames. One embodiment of the logic associated with processing those frames is described with reference to FIG. 8.

Figure 8:
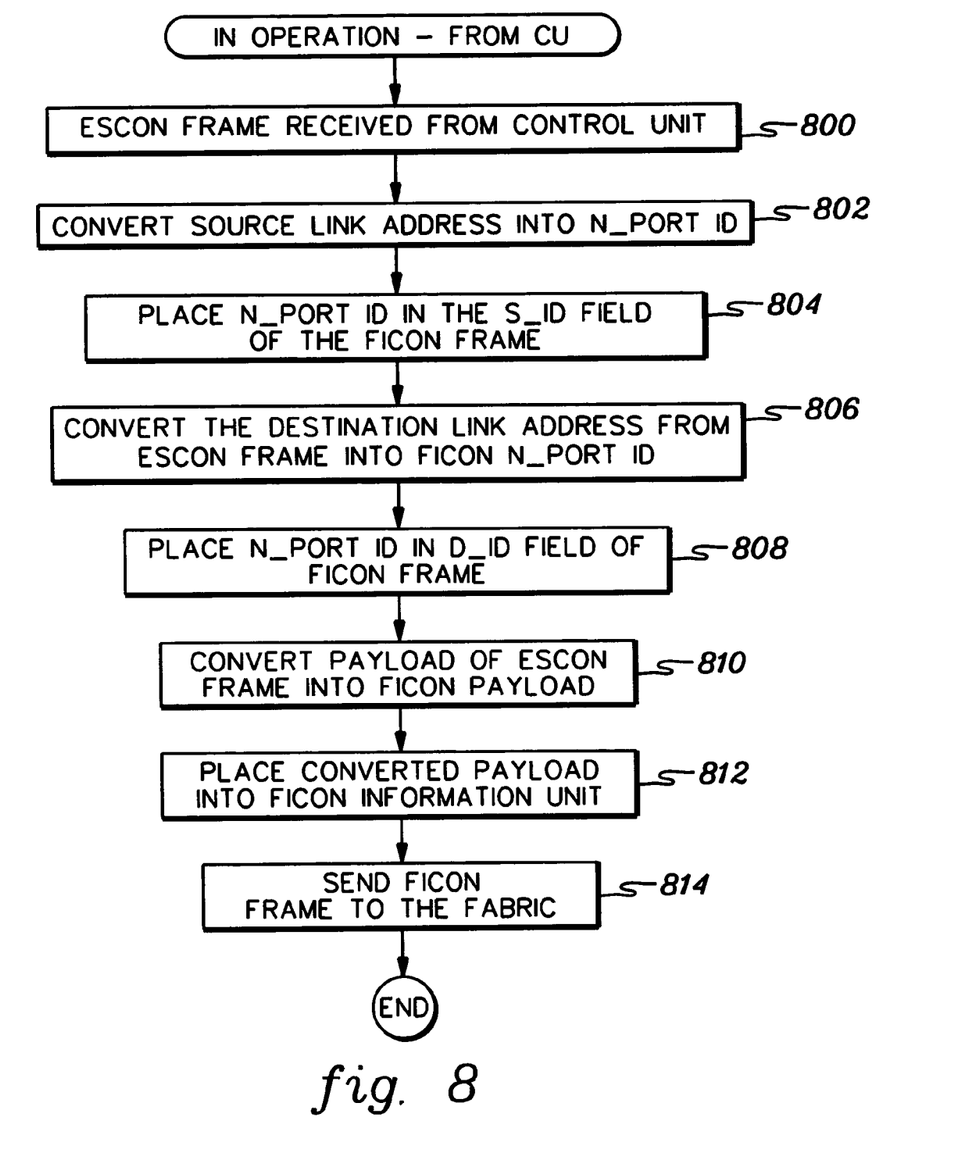
FIG. 8 depicts one embodiment of the logic associated with a protocol converter handling frames received from control units and destined for channels, in accordance with an aspect of the present invention.

Initially, an ESCON frame is received by the protocol converter from a control unit, STEP 800. In response thereto, the protocol converter converts the source link address from the ESCON frame into a corresponding N_Port ID, STEP 802. In one example, this conversion is performed using data structure 200 of FIG. 2. In this example, the link address is used as an index into the table to locate the appropriate row. The N_Port ID of that row is selected. The protocol converter then places the selected N_Port ID in the S_ID field of the FICON frame, STEP 804.

Additionally, the protocol converter converts the destination link address (which may be, as examples, preconfigured or provided to the protocol converter) from the ESCON frame into the corresponding FICON N_Port ID, STEP 806. In one example, this conversion is performed using data structure 300 of FIG. 3, in a similar manner to that described above. Thereafter, the protocol converter places the N_Port ID in the D_ID field of the FICON frame, STEP 808.

Moreover, the protocol converter converts the payload of the ESCON frame into corresponding FICON payload, STEP 810, and places the converted payload into the FICON information unit and/or other fields of the FICON frame, STEP 812. The FICON frame is then sent to the fabric, STEP 814. As one example, this conversion is performed similarly to the payload conversion described above. For instance, when the protocol converter converts ESCON frame payloads into FICON frame payloads, it conforms to the requirements of the FC-SB-3 and SBCON standards and performs the reverse of the procedure used to convert FICON frames to ESCON frames.

Described in detail above is a capability that facilitates communications between components having different communications protocols. The capability includes the use of a protocol converter coupled between the components having the differing protocols to convert communications of one protocol to communications of another protocol, so that the component receiving the communication believes that the communication was sent in its protocol. The protocol converter obtains (e.g., receives, is provided, has, builds, etc.) a communication from one component of one protocol that is to be converted and forwarded to a component of another protocol. The conversion includes converting identifiers of one protocol to identifiers of the other protocol.

One or more aspects of the present invention advantageously enable components of different protocols to communicate with one another without requiring code changes for either of the components. This is a significant simplification to the process of upgrading systems in the field that greatly decreases the cost and complexity of the upgrade. Communications is accomplished simply by the insertion of the protocol converter in the connection between the components.

Advantageously, one or more aspects of the present invention provide a capability for converting destination addresses from one link type to destination addresses of another link type. Further, physical port numbers of ports of one protocol (ESCON physical ports) are associated with unique identifiers of another protocol (WWPNs), preconfigured address identifiers (N_Port IDs) corresponding to the physical port numbers are acquired, and the preconfigured address identifiers (N_Port IDs) are associated with preconfigured entries in a configuration database in a channel (IOCDS). Protocol conversion is provided between a plurality of different data transport media, including address translation between the plurality of different transport media.

Further, advantageously, error reporting data is converted from one protocol to the other.

Although various examples are described above, these are only examples. Many variations may be provided without departing from the spirit of the present invention. As one example, a communications environment other than the one described herein may benefit from one or more aspects of the present invention. For instance, components other than FICON channels and/or ESCON control units may be used, such as other types of channels and/or control units. Further, input/output drivers, other than channels may be used. Yet further, input/output (I/O) units, other than control units, such as I/O devices or other peripheral devices, may be used. Further, other types of components may be used. Additionally, other types of identifiers may be converted. Many other variations are possible and are included herein.

As a further example, the protocol converter may be included within the fabric, coupled thereto or a combination thereof.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating communications between components of a communications environment, said method comprising:
   obtaining, by a protocol converter, a communication to be communicated from one component of the communications environment to another component of the communications environment, wherein the one component is of one protocol and the another component is of another protocol that differs from the one protocol, and wherein the communication is absent protocol specific data of the another protocol, said communication including a source identifier, a destination identifier and an information field including payload, said payload being in a format of the one protocol and comprising a plurality of fields including at least one of one or more flags, one or more counts and data; and
   translating, by the protocol converter, at least a portion of the communication from the one protocol to the another protocol, wherein the translating is performed absent modifications of the one component, and wherein the translating includes translating payload of the one protocol to payload corresponding to the another protocol, the translating of the payload including:
      determining that a field in the payload of the one protocol has no corresponding field in the another protocol; and
      performing an action to accommodate the field in the another protocol, the action transparent to the another component of the communications environment.

2. The method of claim 1, wherein the protocol converter is coupled to the one component and the another component.

3. The method of claim 2, wherein the one component comprises one of an input/output driver and an input/output unit and the another component comprises the other of an input/output driver and an input/output unit.

4. The method of claim 3, wherein the protocol of the input/output driver is FICON and the protocol of the input/output unit is ESCON.

5. The method of claim 3, wherein the protocol converter comprises a node port and a plurality of input/output unit ports, an input/output unit port of the plurality of input/output unit ports coupling the protocol converter to the input/output unit, said node port having multiple identifiers associated therewith, and wherein a plurality of identifiers of the multiple identifiers are assigned to the plurality of input/output unit ports, and wherein the translating comprises converting an identifier assigned to the input/output unit port of the input/output unit to a link address of the input/output unit.

6. The method of claim 5, wherein the plurality of identifiers for the plurality of input/output unit ports are preconfigured and stored in a fabric accessible by the protocol converter.

7. The method of claim 3, wherein the translating comprises converting a virtual link address of the communication designating an input/output driver to receive the communication to an identifier understandable by the input/output driver.

8. The method of claim 1, wherein the translating comprises converting at least one identifier of the communication from the one protocol to at least one converted identifier specified in the another protocol.

9. The method of claim 8, wherein the converting comprises employing one or more data structures to convert the at least one identifier.

10. The method of claim 9, further comprising creating at least one data structure of the one or more data structures.

11. The method of claim 10, wherein the one component comprises one of an input/output driver and an input/output unit and the another component comprises the other of an input/output driver and an input/output unit, and the creating of an input/output unit data structure of the at least one data structure comprises:
    providing in the input/output data structure one or more identifiers for one or more ports associated with one or more input/output units of the communications environment, said one or more identifiers being in a format corresponding to a protocol of the input/output driver; and
    providing in the input/output data structure one or more port identifiers for the one or more ports, said one or more port identifiers being in a format corresponding to a protocol of the input/output unit.

12. The method of claim 11, wherein the one component comprises one of an input/output driver and an input/output unit and the another component comprises the other of an input/output driver and an input/output unit, and wherein the creating of a input/output driver data structure of the at least one data structure comprises:
    providing in the input/output driver data structure one or more input/output driver identifiers of one or more input/output drivers, said one or more input/output driver identifiers being in a format corresponding to a protocol of the input/output driver; and
    providing in the input/output driver data structure one or more virtual identifiers for the one or more input/output drivers, the one or more virtual identifiers being in a format corresponding to a protocol of the input/output unit.

13. The method of claim 12, wherein the communication is from an input/output driver to an input/output unit, and wherein the converting comprises using the input/output unit data structure to convert the destination identifier from a format corresponding to the input/output driver to a format corresponding to the input/output unit.

14. The method of claim 13, wherein the converting further comprises using the input/output driver data structure to convert the source identifier from a format corresponding to the input/output driver to a format corresponding to the input/output unit.

15. The method of claim 12, wherein the communication is from an input/output unit to an input/output driver, and wherein the converting comprises using the input/output driver data structure to convert the destination identifier from a format corresponding to the input/output unit to a format corresponding to the input/output driver.

16. The method of claim 15, wherein the converting further comprises using the input/output unit data structure to convert the source identifier from a format corresponding to the input/output unit to a format corresponding to the input/output driver.

17. The method of claim 1, wherein the translating payload further comprises changing a value in a field in the payload to a value corresponding to the another protocol.

18. The method of claim 1, wherein the determining comprises determining that a flag is set in the one protocol but that flag does not exist in the another protocol, and the performing an action comprises generating one or more responses on behalf of the another component to be sent to the one component, in response to the flag being set.

19. A system of facilitating communications between components of a communications environment, said system comprising:
   a protocol converter to obtain a communication to be communicated from one component of the communications environment to another component of the communications environment, wherein the one component is of one protocol and the another component is of another protocol that differs from the one protocol, and wherein the communication is absent protocol specific data of the another protocol, said communication including a source identifier, a destination identifier and an information field including payload, said payload being in a format of the one protocol and comprising a plurality of fields including at least one of one or more flags, one or more counts and data; and
   the protocol converter to translate at least a portion of the communication from the one protocol to the another protocol, wherein the translating is performed absent modifications of the one component, and wherein the translating includes translating payload of the one protocol to payload corresponding to the another protocol, the translating of the payload including:
      determining that a field in the payload of the one protocol has no corresponding field in the another protocol; and
      performing an action to accommodate the field in the another protocol, the action transparent to the another component of the communications environment.

20. The system of claim 19, wherein the translating comprises converting at least one identifier of the communication from the one protocol to at least one converted identifier specified in the another protocol, wherein the converting comprises employing one or more data structures to convert the at least one identifier.

21. The system of claim 20, wherein the one component comprises one of an input/output driver and an input/output unit and the another component comprises the other of an input/output driver and an input/output unit, and wherein the protocol converter comprises a node port and a plurality of input/output unit ports, an input/output unit port of the plurality of input/output unit ports coupling the protocol converter to the input/output unit, said node port having multiple identifiers associated therewith, and wherein a plurality of identifiers of the multiple identifiers are assigned to the plurality of input/output unit ports, and wherein the means for translating comprises means for converting an identifier assigned to the input/output unit port of the input/output unit to a link address of the input/output unit.

22. The system of claim 20, wherein the one component comprises one of an input/output driver and an input/output unit and the another component comprises the other of an input/output driver and an input/output unit, and the one or more data structures comprises an input/output unit data structure comprising:
   one or more identifiers for one or more ports associated with one or more input/output units of the communications environment, said one or more identifiers being in a format corresponding to a protocol of the input/output driver; and
   one or more port identifiers for the one or more ports, said one or more port identifiers being in a format corresponding to a protocol of the input/output unit.

23. The system of claim 22, wherein the one component comprises one of an input/output driver and an input/output unit and the another component comprises the other of an input/output driver and an input/output unit, and wherein the one or more data structures comprises an input/output driver data structure comprising:
   one or more input/output driver identifiers of one or more input/output drivers, said one or more input/output driver identifiers being in a format corresponding to a protocol of the input/output driver; and
   one or more virtual identifiers for the one or more input/output drivers, the one or more virtual identifiers being in a format corresponding to a protocol of the input/output unit.

24. The system of claim 23, wherein the communication is from an input/output unit driver to an input/output unit, and wherein the converting comprises using the input/output unit data structure to convert the destination identifier from a format corresponding to the input/output driver to a format corresponding to the input/output unit, and using the input/output driver data structure to convert the source identifier from a format corresponding to the input/output driver to a format corresponding to the input/output unit.

25. The system of claim 23, wherein the communication is from an input/output unit to an input/output driver, and wherein the converting comprises using the input/output driver data structure to convert the destination identifier from a format corresponding to the input/output unit to a format corresponding to the input/output driver, and the input/output unit data structure to convert the source identifier from a format corresponding to the input/output unit to a format corresponding to the input/output driver.

26. The system of claim 19, wherein the translating payload further comprises changing a value in a field in the payload to a value corresponding to the another protocol.

27. The system of claim 19, wherein the determining comprises determining that a flag is set in the one protocol but that flag does not exist in the another protocol, and the performing an action comprises generating one or more responses on behalf of the another component to be sent to the one component, in response to the flag being set.

28. A system of facilitating communications between input/output drivers and input/output units of a communications environment, said system comprising:
   a protocol converter to obtain a communication from an input/output driver of the communications environment destined for an input/output unit of the communications environment, said input/output driver supporting one communications protocol and said input/output unit supporting another communications protocol that differs from the one communications protocol, said communication including a source identifier, a destination identifier and an information field including payload, said payload being in a format of the one protocol and comprising a plurality of fields including at least one of one or more flags, one or more counts and data;

the protocol converter to translate payload of the communication that is in the one communications protocol to payload corresponding to the another communications protocol, wherein the translating is performed absent modification of the input/output driver, the translating of the payload comprising:
examining contents of the payload, including examining one or more fields of the payload; and
performing an action, based on the contents, relating to a field of the payload that is in a format of the one communications protocol, wherein the action provides an accommodation for that field for the another communications protocol, the action transparent to the another component of the communications environment;
the protocol converter to translate the destination identifier specified in the communication that is of the one communications protocol to a destination identifier of the another communications protocol, wherein the destination identifier is of the input/output unit for which the communication is destined and the translating is performed absent modification of the input/output driver; and
the protocol converter to forward a translated communication to the input/output unit, said translated communication comprising the destination identifier and payload of the another communications protocol.

29. A system of facilitating communications between input/output drivers and input/output units of a communications environment, said system comprising:
a protocol converter to obtain a communication from an input/output unit of the communications environment destined for an input/output driver of the communications environment, said input/output unit supporting one communications protocol and said input/output driver supporting another communications protocol that differs from the one communications protocol, said communication including a source identifier, a destination identifier and an information field including payload, said payload being in a format of the one protocol and comprising a plurality of fields including at least one of one or more flags, one or more counts and data;
the protocol converter to translate payload of the communication that is in the one communications protocol to payload corresponding to the another communications protocol, wherein the translating is performed absent modification of the input/output driver, the translating of the payload comprising:
examining contents of the payload, including examining one or more fields of the payload; and
performing an action, based on the contents, relating to a field of the payload that is in a format of the one communications protocol, wherein the action provides an accommodation for that field for the another communications protocol, the action transparent to the another component of the communications environment;
the protocol converter to translate the destination identifier specified in the communication that is of the one communications protocol to a destination identifier of the another communications protocol, wherein the destination identifier is of the input/output driver for which the communication is destined and the translating is performed absent modification of the input/output driver; and
the protocol converter to forward a translated communication to the input/output driver, said translated communication comprising the destination identifier of the another communications protocol.

30. A computer program product for facilitating communications between components of a communications environment, the computer program product comprising
a storage medium readable by a computer and storing instructions for execution by the computer for performing a method, the method comprising:
obtaining a communication to be communicated from one component of the communications environment to another component of the communications environment, wherein the one component is of one protocol and the another component is of another protocol that differs from the one protocol, and wherein the communication is absent protocol specific data of the another protocol, said communication including a source identifier, a destination identifier and an information field including payload, said payload being in a format of the one protocol and comprising a plurality of fields including at least one of one or more flags, one or more counts and data; and
translating at least a portion of the communication from the one protocol to the another protocol, wherein the translating is performed absent modifications of the one component, and wherein the translating includes translating payload of the one protocol to payload corresponding to the another protocol, the translating of the payload including:
determining that a field in the payload of the one protocol has no corresponding field in the another protocol; and
performing an action to accommodate the field in the another protocol, the action transparent to the another component of the communications environment.

31. The computer program product of claim 30, wherein the translating is performed by a protocol converter coupled to the one component and the another component.

32. The computer program product of claim 31, wherein the one component comprises one of an input/output driver and an input/output unit and the another component comprises the other of an input/output driver and an input/output unit.

33. The computer program product of claim 32, wherein the protocol converter comprises a node port and a plurality of input/output unit ports, an input/output unit port of the plurality of input/output unit ports coupling the protocol converter to the input/output unit, said node port having multiple identifiers associated therewith, and wherein a plurality of identifiers of the multiple identifiers are assigned to the plurality of input/output unit ports, and wherein the translate logic comprises convert logic to convert an identifier assigned to the input/output unit port of the input/output unit to a link address of the input/output unit.

34. The computer program product of claim 33, wherein the plurality of identifiers for the plurality of input/output unit ports are preconfigured and stored in a fabric accessible by the protocol converter.

35. The computer program product of claim 32, wherein the translating comprises converting a virtual link address of the communication designating an input/output driver to receive the communication to an identifier understandable by the input/output driver.

36. The computer program product of claim 30, wherein the translating comprises converting at least one identifier of the communication from the one protocol and to at least one converted identifier specified in the another protocol.

37. The computer program product of claim 36, wherein the converting comprises employing one or more data structures to convert the at least one identifier.

38. The computer program product of claim 37, further comprising creating at least one data structure of the one or more data structures.

39. The computer program product of claim 38, wherein the one component comprises one of an input/output driver and an input/output unit and the another component comprises the other of an input/output driver and an input/output unit, and the creating an input/output unit data structure of the at least one data structure comprises:
   providing in the input/output unit data structure one or more identifiers for one or more ports associated with one or more input/output units of the communications environment, said one or more identifiers being in a format corresponding to a protocol of the input/output driver; and
   providing in the input/output unit data structure one or more port identifiers for the one or more ports, said one or more port identifiers being in a format corresponding to a protocol of the input/output unit.

40. The computer program product of claim 39, wherein the one component comprises one of an input/output driver and an input/output unit and the another component comprises the other of an input/output driver and an input/output unit, and wherein the creating an input/output driver data structure of the at least one data structure comprises:
   providing in the input/output driver data structure one or more input/output driver identifiers of one or more input/output drivers, said one or more input/output driver identifiers being in a format corresponding to a protocol of the input/output driver; and
   providing in the input/output driver data structure one or more virtual identifiers for the one or more input/output drivers, the one or more virtual identifiers being in a format corresponding to a protocol of the input/output unit.

41. The computer program product of claim 40, wherein the communication is from an input/output driver to an input/output unit, and wherein the converting comprises using the input/output unit data structure to convert the destination identifier from a format corresponding to the input/output driver to a format corresponding to the input/output unit.

42. The computer program product of claim 41, wherein the converting further comprises using the input/output driver data structure to convert the source identifier from a format corresponding to the input/output driver to a format corresponding to the input/output unit.

43. The computer program product of claim 40, wherein the communication is from an input/output unit to an input/output driver, and wherein the converting comprises using the input/output driver data structure to convert the destination identifier of the from a format corresponding to the input/output unit to a format corresponding to the input/output driver.

44. The computer program product of claim 43, wherein the converting further comprises using the input/output unit data structure to convert the source identifier from a format corresponding to the input/output unit to a format corresponding to the input/output driver.

45. The computer program product of claim 30, wherein the translating payload further comprises changing a value in a field in the payload to a value corresponding to the another protocol.

46. The computer program product of claim 30, wherein the determining comprises determining that a flag is set in the one protocol but that flag does not exist in the another protocol, and the performing an action comprises generating one or more responses on behalf of the another component to be sent to the one component, in response to the flag being set.

47. A computer program product for facilitating communications between input/output drivers and input/output units of a communications environment, the computer program product comprising:
   a storage medium readable by a computer and storing instructions for execution by the computer for performing a method comprising:
      obtaining by a protocol converter a communication from an input/output driver of the communications environment destined for an input/output unit of the communications environment, said input/output driver supporting one communications protocol and said input/output unit supporting another communications protocol that differs from the one communications protocol, said communication including a source identifier, a destination identifier and an information field including payload, said payload being in a format of the one protocol and comprising a plurality of fields including at least one of one or more flags, one or more counts and data;
      translating by the protocol converter payload of the communication that is in the one communications protocol to payload corresponding to the another communications protocol, wherein the translating is performed absent modification of the input/output driver, the translating of the payload including:
         examining contents of the payload, including examining one or more fields of the payload; and
         performing an action, based on the contents, relating to a field of the payload that is in a format of the one communications protocol, wherein the action provides an accommodation for that field for the another communications protocol, the action transparent to the another component of the communications environment;
      translating by the protocol converter the destination identifier specified in the communication that is of the one communications protocol to a destination identifier of the another communications protocol, wherein the destination identifier is of the input/output unit for which the communication is destined and the translating is performed absent modification of the input/output driver; and
      forwarding a translated communication to the input/output unit, said translated communication comprising the destination identifier and payload of the another communications protocol.

48. The computer program product of claim 47, wherein the translating further comprises translating the source identifier specified in the communication from the one communications protocol to a source identifier of the another communications protocol, and wherein the translating comprises employing one or more data structures to translate at least one of the destination identifier and the source identifier.

49. The computer program product of claim 47, further comprising determining that a field in the payload of the one communications protocol has no corresponding field in the another communications protocol, and wherein the performing accommodates the field in the another communications protocol.

50. A computer program product for facilitating communications between input/output drivers and input/output units of a communications environment, the computer program product comprising:
    a storage medium readable by a computer and storing instructions for execution by the computer for performing a method comprising:
        obtaining by a protocol converter a communication from an input/output unit of the communications environment destined for an input/output driver of the communications environment, said input/output unit supporting one communications protocol and said input/output driver supporting another communications protocol that differs from the one communications protocol, said communication including a source identifier, a destination identifier and an information field including payload, said payload being in a format of the one protocol and comprising a plurality of fields including at least one of one or more flags, one or more counts and data;
        translating by the protocol converter payload of the communication that is in the one communications protocol to payload corresponding to the another communications protocol, wherein the translating is performed absent modification of the input/output driver, the translating of the payload including:
            examining contents of the payload, including examining one or more fields of the payload; and
            performing an action, based on the contents, relating to a field of the payload that is in a format of the one communications protocol, wherein the action provides an accommodation for that field for the another communications protocol, the action transparent to the another component of the communications environment;
        translating by the protocol converter the destination identifier specified in the communication that is of the one communications protocol to a destination identifier of the another communications protocol, wherein the destination identifier is of the input/output driver for which the communication is destined and the translating is performed absent modification of the input/output driver; and
        forwarding a translated communication to the input/output driver, said translated communication comprising the destination identifier and payload of the another communications protocol.

51. The computer program product of claim 50, wherein the translating further comprises translating the source identifier specified in the communication from the one communications protocol to a source identifier of the another communications protocol, and wherein the translating comprises employing one or more data structures to translate at least one of the destination identifier and the source identifier.

52. The computer program product of claim 50, further comprising determining that a field in the payload of the one communications protocol has no corresponding field in the another communications protocol, and wherein the performing accommodates the field in the another communications protocol.

53. A method of facilitating communications between input/output drivers and input/output units of a communications environment, the method comprising:
    obtaining by a protocol converter a communication from an input/output driver of the communications environment destined for an input/output unit of the communications environment, said input/output driver supporting one communications protocol and said input/output unit supporting another communications protocol that differs from the one communications protocol, said communication including a source identifier, a destination identifier and an information field including payload, said payload being in a format of the one protocol and comprising a plurality of fields including at least one of one or more flags, one or more counts and data;
    translating by the protocol converter payload of the communication that is in the one communications protocol to payload corresponding to the another communications protocol, wherein the translating is performed absent modification of the input/output driver, the translating of the payload including:
        examining contents of the payload, including examining one or more fields of the payload; and
        performing an action, based on the contents, relating to a field of the payload that is in a format of the one communications protocol, wherein the action provides an accommodation for that field for the another communications protocol, the action transparent to the another component of the communications environment;
    translating by the protocol converter the destination identifier specified in the communication that is of the one communications protocol to a destination identifier of the another communications protocol, wherein the destination identifier is of the input/output unit for which the communication is destined and the translating is performed absent modification of the input/output driver; and
    forwarding a translated communication to the input/output unit, said translated communication comprising the destination identifier and payload of the another communications protocol.

\* \* \* \* \*

UNITED STATES PATENT AND TRADEMARK OFFICE
CERTIFICATE OF CORRECTION

PATENT NO. : 7,668,196 B2  Page 1 of 1
APPLICATION NO. : 11/042488
DATED : February 23, 2010
INVENTOR(S) : Dugan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1009 days.

Signed and Sealed this

Seventh Day of December, 2010

David J. Kappos
*Director of the United States Patent and Trademark Office*